(12) United States Patent
Cho et al.

(10) Patent No.: US 12,495,836 B2
(45) Date of Patent: Dec. 16, 2025

(54) AEROSOL GENERATING DEVICE FOR VARIABLY CONTROLLING POWER

(71) Applicant: KT&G CORPORATION, Daejeon (KR)

(72) Inventors: Byung Sung Cho, Gwangmyeong-si (KR); Min Kyu Kim, Seoul (KR); Ju Eon Park, Seoul (KR); Jong Sub Lee, Seongnam-si (KR)

(73) Assignee: KT&G CORPORATION, Daejeon (KR)

( * ) Notice: Subject to any disclaimer, the term of this patent is extended or adjusted under 35 U.S.C. 154(b) by 851 days.

(21) Appl. No.: 17/604,631

(22) PCT Filed: Aug. 2, 2021

(86) PCT No.: PCT/KR2021/010076
§ 371 (c)(1),
(2) Date: Oct. 18, 2021

(87) PCT Pub. No.: WO2022/045612
PCT Pub. Date: Mar. 3, 2022

(65) Prior Publication Data
US 2022/0378108 A1    Dec. 1, 2022

(30) Foreign Application Priority Data
Aug. 28, 2020    (KR) .................. 10-2020-0109485

(51) Int. Cl.
*A24F 40/57*    (2020.01)
*A24F 40/10*    (2020.01)
(Continued)

(52) U.S. Cl.
CPC .............. *A24F 40/57* (2020.01); *A24F 40/10* (2020.01); *A24F 40/20* (2020.01); *A24F 40/30* (2020.01);
(Continued)

(58) Field of Classification Search
CPC ..................................................... A24F 40/57
See application file for complete search history.

(56) References Cited

U.S. PATENT DOCUMENTS 9,423,152 B2    8/2016 Ampolini et al.
9,532,605 B2 *  1/2017 Yamada ................. A24F 40/60
(Continued)

FOREIGN PATENT DOCUMENTS

CN    105636466 A    6/2016
CN    110799050 A    2/2020
(Continued)

OTHER PUBLICATIONS

English translation of KR 20150084779 A obtained from Espacenet (Year: 2024).*
(Continued)

*Primary Examiner* — Russell E Sparks
(74) *Attorney, Agent, or Firm* — Sughrue Mion, PLLC (57) ABSTRACT

An aerosol-generating device includes a heater configured to heat an aerosol-generating material, a puff detection sensor configured to detect puffs of a user, a battery configured to supply power to the heater, and a controller configured to: based on a new puff being detected by the puff detection sensor, count a number of accumulated puffs including the new puff, determine a puff section corresponding to the number of accumulated puffs from among a plurality of puff sections which are divided according to the number of accumulated puffs, and control the power supplied to the heater based on a power range preset for the determined puff section.

9 Claims, 9 Drawing Sheets

(51) Int. Cl.
- *A24F 40/20* (2020.01)
- *A24F 40/30* (2020.01)
- *A24F 40/42* (2020.01)
- *A24F 40/51* (2020.01)
- *A24F 40/60* (2020.01)
- *H05B 1/02* (2006.01)

(52) U.S. Cl.
CPC .............. *A24F 40/42* (2020.01); *A24F 40/51* (2020.01); *A24F 40/60* (2020.01); *H05B 1/02* (2013.01)

(56) References Cited

U.S. PATENT DOCUMENTS

| | | | |
|---|---|---|---|
| 9,808,032 | B2 | 11/2017 | Yamada et al. |
| 10,667,559 | B2 | 6/2020 | Bessant et al. |
| 10,869,503 | B2 * | 12/2020 | Yamada .................. A24F 40/50 |
| 11,871,793 | B1 * | 1/2024 | Abehasera .............. A24F 40/10 |
| 2016/0206005 | A1 | 7/2016 | Yamada et al. |
| 2016/0331040 | A1 | 11/2016 | Nakano et al. |
| 2019/0387796 | A1 | 12/2019 | Cohen |
| 2020/0329776 | A1 | 10/2020 | Lee |
| 2021/0106051 | A1 | 4/2021 | Han et al. |
| 2021/0145057 | A1 | 5/2021 | Reevell |
| 2022/0079239 | A1 | 3/2022 | Lim, II et al. |

FOREIGN PATENT DOCUMENTS

| | | | | |
|---|---|---|---|---|
| CN | 111542240 | A | 8/2020 | |
| EP | 2 856 893 | A1 | 4/2015 | |
| EP | 2 989 912 | A1 | 3/2016 | |
| EP | 3 042 576 | A1 | 7/2016 | |
| EP | 3 138 424 | A1 | 3/2017 | |
| EP | 3 488 715 | A2 | 5/2019 | |
| EP | 3818869 | A1 | 5/2021 | |
| JP | 2020-511998 | A | 4/2020 | |
| KR | 20150084779 | A * | 7/2015 | |
| KR | 10-2015-0130458 | A | 11/2015 | |
| KR | 10-2018-0111460 | A | 10/2018 | |
| KR | 10-1939004 | B1 | 1/2019 | |
| KR | 10-2019-0038181 | A | 4/2019 | |
| KR | 10-2019-0051785 | A | 5/2019 | |
| KR | 10-2020-0057491 | A | 5/2020 | |
| WO | 98/17130 | A1 | 4/1998 | |
| WO | WO-2013034459 | A1 * | 3/2013 | ............... A24F 1/28 |
| WO | 2015/046420 | A1 | 4/2015 | |
| WO | 2019/122344 | A1 | 6/2019 | |
| WO | WO-2020231106 | A2 * | 11/2020 | ............. A24F 40/46 |

OTHER PUBLICATIONS

English translation of KR 20190038181 A obtained from Espacenet (Year: 2024).*

English translation of KR 20180111460 obtained from Espacenet (Year: 2024).*

Office Action dated Apr. 20, 2023 from the Chinese Patent Office in Application No. 202180003683.4.

Office Action issued Dec. 13, 2022 in Japanese Application No. 2021-568971.

International Search Report dated Nov. 8, 2021 from the International Searching Authority in International Application No. PCT/KR2021/010076.

Extended European Search Report dated May 27, 2022 in European Application No. 21778337.2.

* cited by examiner

AEROSOL GENERATING DEVICE FOR VARIABLY CONTROLLING POWER

CROSS REFERENCE TO RELATED APPLICATIONS

This application is a National Stage of International Application No. PCT/KR2021/010076 filed Aug. 2, 2021, claiming priority based on Korean Patent Application No. 10-2020-0109485 filed Aug. 28, 2020.

TECHNICAL FIELD

One or more embodiments of the present disclosure relate to an aerosol-generating device for variably controlling power according to the number of puffs.

BACKGROUND ART

Recently, the demand for an alternative to traditional cigarettes has increased. For example, there is increasing demand for an aerosol generating device that generates an aerosol by heating an aerosol generating material in cigarettes without combustion. Accordingly, studies on a heating-type cigarette and a heating-type aerosol generating device have been actively conducted.

DISCLOSURE

Technical Problem

As the number of puffs on an aerosol-generating product increases, the amount of tobacco components or flavor components (e.g., nicotine) included in an aerosol generated from the aerosol-generating product may gradually decrease. In this case, as the amount of nicotine transferred in each puff may differ, thereby reducing the smoking satisfaction of the user.

Thus, the present disclosure provides an aerosol-generating device capable of providing a uniform amount of transferred nicotine by controlling power variably according to the number of puffs.

The technical problems of the present disclosure are not limited to the above-described description, and other technical problems may be derived from the embodiments to be described hereinafter.

Technical Solution

According to an aspect of the present disclosure, an aerosol-generating device includes a heater configured to heat an aerosol-generating material, a puff detection sensor configured to detect puffs of a user, a battery configured to supply power to the heater, and a controller configured to: based on a new puff being detected by the puff detection sensor, count a number of accumulated puffs including the new puff, determine a puff section corresponding to the number of accumulated puffs from among a plurality of puff sections which are divided according to the number of accumulated puffs, and control the power supplied to the heater based on a power range preset for the determined puff section.

Advantageous Effects

One or more embodiments of the present disclosure provide an aerosol-generating device. In detail, the aerosol-generating device may variably control the power according to a puff section corresponding to the number of accumulated puffs. Accordingly, the aerosol-generating device may provide a uniform amount of transferred nicotine to a user. Effects of the present disclosure are not limited to those stated above, and various effects may be included in the present specification.

MODE FOR INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er," "-or," and "module" described in the specification mean units for processing at least one function and/or operation and can be implemented by hardware components or software components and combinations thereof.

As used herein, expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Figure 1:
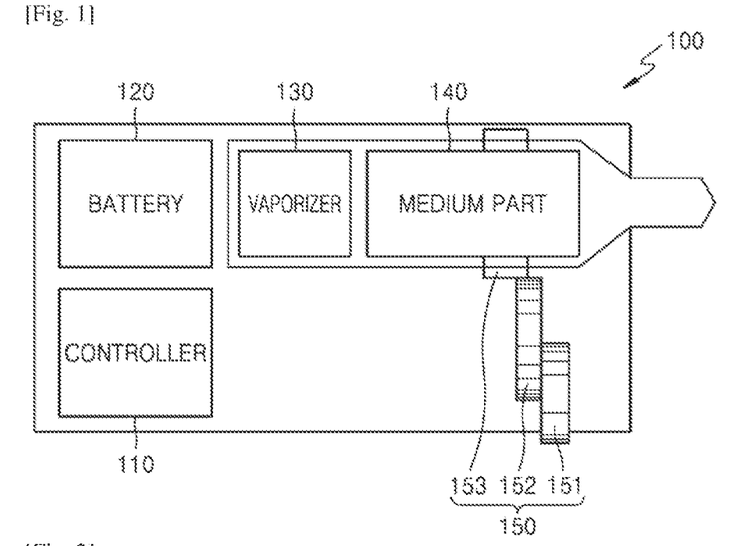
FIG. 1 illustrates a structure of an aerosol-generating device according to an embodiment.

FIG. 1 illustrates a structure of an aerosol-generating device according to an embodiment.

Referring to FIG. 1, the aerosol-generating device 100 may include a controller 110, a battery 120, a vaporizer 130, and a medium part 140.

The aerosol-generating device 100 of FIG. 1 includes components related to the present embodiment. Therefore, it would be understood by one of ordinary skill in the art that the aerosol-generating device 100 may further include other general-purpose components in addition to the components shown in FIG. 1. Also, an internal structure of the aerosol-generating device 100 is not limited to the illustration of FIG. 1. In other words, depending on a design of the aerosol-generating device 100, arrangements of the controller 110, the battery 120, the vaporizer 130, and the medium part 140 may change.

The aerosol-generating device 100 of FIG. 1 provides an aerosol to a user and may generate an aerosol by using a resistance heating method, an induction heating method, or an ultrasonic vibration method.

The controller 110 may generally control operations of the aerosol generating device 100. In detail, the controller 110 may control not only operations of the battery 120, and the vaporizer 130, but also operations of other components included in the aerosol generating device 100. Also, the controller 110 may check a state of each of the components of the aerosol generating device 100 to determine whether or not the aerosol generating device 100 is able to operate.

The controller 110 can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The battery 120 may supply power to be used for the aerosol generating device 100 to operate. For example, the battery 120 may supply power to heat the vaporizer 130. As another example, the battery 120 may supply power for operating the controller 110. Also, the battery 120 may supply power for operations of a display, a sensor, a motor, etc. mounted in the aerosol generating device 100.

The vaporizer 130 may generate an aerosol by converting a phase of a liquid composition into a gaseous phase. The aerosol may refer to a gas in which vaporized particles generated from a liquid composition are mixed with air.

For example, the vaporizer 130 may include a liquid storage, a liquid delivery element, and a heating element (i.e., a heater), but it is not limited thereto. For example, the liquid storage, the liquid delivery element, and the heating element may be included in the aerosol generating device 100 as independent modules.

The liquid storage may store a liquid composition. The liquid composition may be a material in a liquid state or a gel state. The liquid composition may remain impregnated with a porous material such as a sponge or cotton inside the liquid storage.

For example, the liquid composition may be a liquid including a tobacco-containing material having a volatile tobacco flavor component, or a liquid including a non-tobacco material. The liquid storage may be formed to be detachable from the vaporizer 130. Alternatively, the liquid storage may be formed integrally with the vaporizer 130. In this case, the vaporizer 130 may be detachable from the aerosol-generating device 100.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned in contact with or adjacent to the liquid delivery element, or may be wound around the liquid delivery element. The heating element may be surrounded by the liquid storage.

The heating element may be heated by a current supply and may transfer heat to the liquid composition in contact with the heating element, thereby heating the liquid composition. However, one or more embodiments are not limited thereto. The vaporizer 130 may generate an aerosol by using, for example, an ultrasonic vibration method or an induction heating method.

The vaporizer 130 may be referred to as a cartridge, a cartomizer, or an atomizer, but is not limited thereto.

The vaporizer 130 may be rotatably coupled to the medium part 140. For example, while the vaporizer 130 is fixed, a plurality of chambers of the medium part 140 may rotate relative to the vaporizer 130.

The vaporizer 130 may be in fluid communication with one of the chambers. For example, the aerosol generated from the vaporizer 130 may pass through only one chamber that is in fluid communication with the vaporizer 130 from among the chambers.

The vaporizer 130 may include an outlet extending in a lengthwise direction of the aerosol-generating device 100 and transmitting therethrough the aerosol to the medium part 140. The vaporizer 130 may transmit the aerosol generated by the heating element to the outlet. Therefore, the aerosol generated from the vaporizer 130 is transmitted to the medium part 140 through the outlet.

As relative locations of the chambers of the medium part 140 with respect to the vaporizer 130 are changed while the vaporizer 130 is coupled to the medium part 140, one of the chambers of the medium part 140 may be aligned with the outlet of the vaporizer 130. Therefore, the aerosol emitted through the outlet of the vaporizer 130 may pass through a tobacco material accommodated in the chamber aligned with the outlet.

The medium part 140 may include the chambers, and the chambers may be separated by partition walls. Each chamber may accommodate the tobacco material such that the aerosol to pass through the tobacco material when the corresponding chamber is aligned with the outlet.

The tobacco material may be variously formed. For example, the tobacco material may be formed as a sheet or a strand. The tobacco material may be formed of tiny bits cut from a tobacco sheet. As another example, the tobacco material may be made in the form of granules or capsules.

The medium part 140 may be rotated relative to the vaporizer 130 and may include the chambers sequentially arranged in a rotation direction. The chambers may be separated from each other in the rotation direction of the medium part 140.

The medium part 140 may include a plurality of chambers, and the number of the chambers are not limited. For example, the medium part 140 may have a cylindrical shape and may include four chambers that are formed by partitioning the inner space of the medium part 140 into four. The medium part 140 may be rotated in a clockwise direction or a counterclockwise direction with respect to the lengthwise axis of the aerosol-generating device 100, and as the medium part 140 is rotated, relative locations of the chambers relative to the vaporizer 130 may be changed.

The aerosol-generating device 100 may include a rotator 150, and the rotator 150 may include a dial 151, a dial gear 152, and a medium part gear 153.

The dial 151 may be rotated by a user action. To this end, part of the dial 151 may exposed the outside of the aerosol-generating device 100. The dial 151 may engage with the dial gear 152, and thus, the rotation may be transmitted.

The medium part gear 153 may surround the medium part 140 such that the medium part 140 rotates along with the medium part gear 153. For example, when a user rotates the dial 151, the rotation force may be transferred to the medium part gear 153 through the dial gear 152, and the medium part 140 may be rotated by the medium part gear 153.

Figure 2:
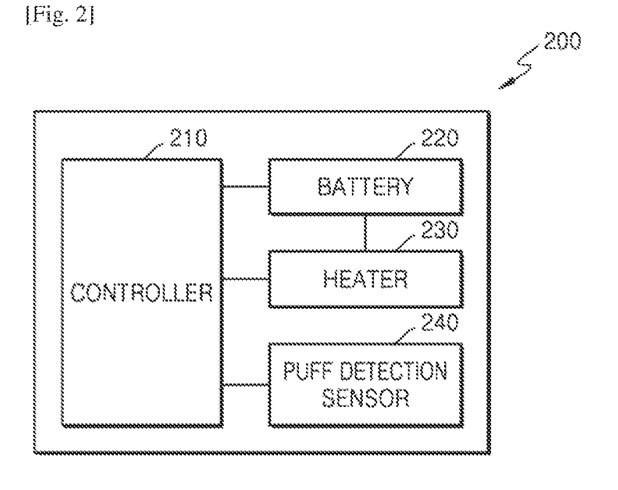
FIG. 2 is a block diagram of an aerosol-generating device according to an embodiment.

FIG. 2 is a block diagram of an aerosol-generating device according to an embodiment.

Referring to FIG. 2, an aerosol-generating device 200 may include a controller 210, a battery 220, a heater 230, and a puff detection sensor 240. Because the controller 210 and the battery 220 correspond to the controller 110 and the battery 120 of FIG. 1, respectively, descriptions thereof will not be repeated.

The puff detection sensor 240 may detect puffs of the user. For example, the puff detection sensor 240 may detect a puff by detecting a change in an air flow inside the aerosol-generating device 200 according to the puff of the user. The puff detection sensor 240 may be a pressure sensor, but is not limited thereto.

The controller 210 may count the number of accumulated puffs based on the puffs of the user that are detected by the puff detection sensor 240. For example, the controller 210 may set the maximum number of accumulated puffs to be 50 for each of the chambers included in a medium part (e.g., the medium part 140 of FIG. 1). The controller 210 may count puffs until the number of accumulated puffs reaches 50 that is the maximum number of accumulated puffs. The above-mentioned number is merely an example, and the maximum number is not limited thereto. According to the number or types of tobacco materials included in each chamber, the maximum number of accumulated puffs may vary.

Also, the controller 210 may output a notification after the number of accumulated puffs reaches the maximum number of accumulated puffs. For example, after the number of accumulated puffs reaches the maximum number of accumulated puffs, the controller 210 may output, through a display (not shown), a message to guide rotation of a dial (e.g., the dial 151 of FIG. 1). As another example, the controller 210 may output a notification vibration through a vibration motor (not shown) after the number of accumulated puffs reaches the maximum number of accumulated puffs. In an embodiment, when the medium part 140 is rotated by a user (e.g., the rotation of the dial 151), the controller 210 may reset the number of accumulated puffs.

The controller 210 may store the number of accumulated puffs in a memory (not shown). For example, when the counted number of accumulated puffs reaches 20, the controller 210 may store, in the memory, data indicating that the number of accumulated puffs is 20. Then, when a new puff is detected by the puff detection sensor 240, the controller 210 may determine that the detected puff is the 21th puff based on the data stored in the memory.

A plurality of puff sections (i.e., smoking stages) may be predetermined by dividing the maximum number of accumulated puffs. Different power ranges may be applied to the puff sections. That is, power supplied to the heater 230 may be controlled differently based on the number of accumulated puffs including the current puff (i.e., a puff that is still in progress). The controller 210 may determine a current puff section based on the number of accumulated puffs, and variably control the power supplied to the heater 230 according to a power range preset for the determined puff section.

In an embodiment, the puff sections may indicate sections having different power ranges and may be obtained by dividing the maximum number of accumulated puffs by designated puff intervals. The designated puff intervals may or may not be uniform.

For example, when the maximum number of accumulated puffs is 50, and when the maximum number of accumulated puffs is divided by ten intervals, the puff sections may include a first puff section including 1st puff to 10th puff, a second puff section including 11th puff to 20th puff, a third puff section including 21st puff to 30th puff, a fourth puff section including 31st puff to 40th puff, and a fifth puff section including 41st puff to 50th puff. In this case, when the number of accumulated puffs counted is 34 (i.e., the current puff is the 34th puff), the current puff section may correspond to the fourth puff section.

The power control by the controller 210 according to the different power ranges is to supply high power to the heater 230 in accordance with an increase in the number of accumulated puffs. This is because a tobacco material included in the medium part is repeatedly used as the number of accumulated puffs increases. If the tobacco material included in the medium part is repeatedly used by constant power, the transfer amount of tobacco components or flavor components may gradually decrease over time. In this respect, according to an embodiment, the controller 210 may control the power based on the different power ranges to provide the user with the uniform transfer amount of tobacco components or flavor components. An embodiment in which power supplied to a heater is variably controlled according to the puff sections will be described below in detail with reference to FIG. 3.

The controller 210 may variably control the power supplied to the heater 230, according to a puff duration. For example, the controller 210 may decrease the power supplied to the heater 230 as the puff duration increases.

The power decrease by the controller 210 according to the increase in the puff duration is to maintain an appropriate heating temperature. The controller 210 may control relatively high power to be supplied when a puff starts such that the heater 230 which has been cooled off may instantaneously increase a heating temperature to a target temperature. However, after the heating temperature reaches the target temperature, the controller 210 may decrease the power to maintain the target temperature or decrease the heating temperature in an appropriate heating temperature range.

In an embodiment, the controller 210 may stop the power supply when the puff duration is equal to or greater than a threshold duration. Otherwise, if the controller 210 keeps supplying the power through the puff duration, the aerosol-generating device 200 may fail to uniformly provide the user with the tobacco components or the flavor components in each puff. Also, when the power is continuously supplied even when the puff duration is equal to or greater than the threshold duration, the heating temperature of the heater 230 may be out of an appropriate heating temperature range, and thus, the heater 230 may be overheated. As a result, and misuse/abuse of the aerosol-generating device 200 or failures resulting from the overheating of the aerosol-generating device 200 may be prevented. An embodiment in which the power supplied to the heater is variably controlled according to the puff duration will be described in detail with reference to FIG. 10.

The controller 210 may variably control the power supplied to the heater 230, based on intervals between puffs. For example, when a puff of the user is detected after a threshold time has passed from the previous puff (e.g., from when the start or the end of the previous puff was detected), the controller 210 may determine that a new puff series is starting and set the power to be relatively high. On the other hand, when a puff of the user is detected before the threshold time is passed from the previous puff, the controller 210 may determine that the current puff is part of a consecutive puffs (i.e., a series of puffs) and set the power as preset power.

The controller 210 may determine whether the heating temperature of the heater 230 is higher than the threshold temperature. When the heating temperature of the heater 230 is higher than the threshold temperature, the controller 210 may control the power supplied to the heater 230 accordingly. For example, when the heating temperature of the heater 230 is higher than a threshold temperature (e.g., 260° C.), the controller 210 may decrease the power supplied to the heater 230 by about 30% to about 70%. In more detail, the controller 210 may decrease the power supplied to the heater 230 by about 40% to about 50%.

The determination as to whether the heating temperature is higher than the threshold temperature is made by the controller 210 to prevent the aerosol-generating device 200 from being overheated and emitting heat to the outside. For example, the heating temperature of the heater 230 may be out of an appropriate heating temperature range because of malfunction of the heater 230 or errors in a device for controlling a heating operation. In this case, the controller 210 may prevent the aerosol-generating device 200 from being overheated or emitting heat to the outside by decreasing the power or stopping the power supply.

The controller 210 may control the heating temperature of the heater 230 by variably controlling the power supplied to the heater 230. For example, when the controller 210 increases the power supplied to the heater 230 (e.g., from 6 W to 7 W) by the battery 220, the heating temperature of the heater 230 may increase (e.g., from 220° C. to 230° C.). When the controller 210 decreases the power supplied to the heater 230 through the battery 220, the heating temperature of the heater 230 may decrease.

Figure 3:
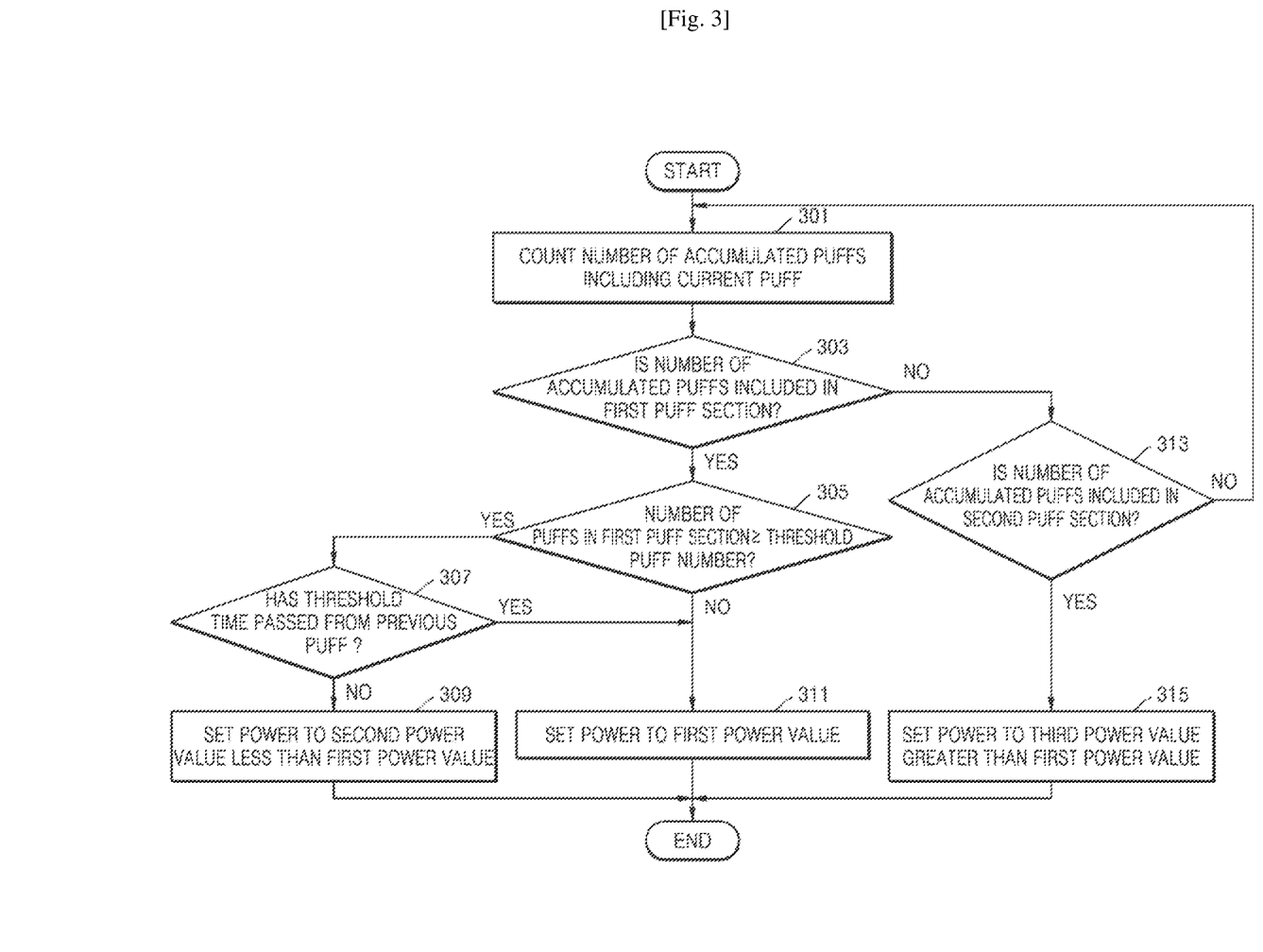
FIG. 3 is a flowchart of an operation of an aerosol-generating device according to an embodiment.

FIG. 3 is a flowchart of an operation of an aerosol-generating device according to an embodiment.

Referring to FIG. 3, in operation 301, a controller (e.g., the controller 210 of FIG. 2) of an aerosol-generating device (e.g., the aerosol-generating device 200 of FIG. 2) may count the number of accumulated puffs based on puffs of the user detected by a puff detection sensor (e.g., the puff detection sensor 240 of FIG. 2).

In operation 303, the controller may determine whether the counted number of accumulated puffs including the current puff (i.e., newly detected puff) is included in a first puff section. For example, if the number of accumulated puffs in the first puff section is 1 to 10, and the number of accumulated puffs is 7 (i.e., the current puff is the 7th puff), the controller may determine that the number of accumulated puffs is included in the first puff section. As another example, when the number of accumulated puffs is 11, the controller may determine that the number of accumulated puffs is not included in the first puff section.

When determining that the number of accumulated puffs is included in the first puff section, the controller may proceed to operation 305, and when the number of accumulated puffs is not included in the first puff section, the controller may proceed to operation 313.

In operation 305, the controller may determine whether the number of puffs counted during the current puff section (i.e., first puff section) is equal to or greater than a threshold puff number. For example, when the number of accumulated puffs in the first puff section is 1 to 10, the threshold puff number in the first puff section may be 3. In this case, when the number of puffs counted during the first puff section is 7, the controller may determine that the number of puffs counted during the first puff section is equal to or greater than the threshold puff number. On the other hand, if the number of puffs counted during the first puff section is 2, the controller may determine that the number of puffs counted during the first puff section is less than the threshold puff number. According to embodiments, the threshold puff number may or may not be uniform for the puff sections.

When the number of accumulated puffs counted during the first puff section is less than the threshold puff number, the controller may proceed to operation 311, and when the number of puffs counted during the first puff section is equal to or greater than the threshold puff number, the controller may proceed to operation 307.

In operation 307, the controller may determine whether the threshold time has passed from the previous puff (e.g., from when the start or the end of the previous puff is detected). When the threshold time has passed from the previous puff, the controller may proceed to operation 311, and when the threshold time has not passed from the previous puff, the controller may proceed to operation 309.

In operation 313, the controller may determine whether the number of accumulated puffs is included in a second puff section. The second puff section may include a greater number of accumulated puffs than the first puff section. For example, the number of accumulated puffs belonging to the second puff section may be 11 to 20. In this case, if the number of accumulated puffs is 15, the controller may determine that the number of accumulated puffs is included in the second puff section.

If the number of accumulated puffs is included in the second puff section, the controller may proceed to operation 315. If the number of accumulated puffs is not included in the second puff section, the controller may return to operation 301 or wait.

Although FIG. 3 illustrates only the first puff section and the second puff section for convenience of explanation, one or more embodiments are not limited thereto. That is, although the maximum number of accumulated puffs is 20 in the embodiment of FIG. 3, embodiments are not limited thereto. For example, in another embodiment, the maximum number of accumulated puffs may be 50. In this case, when the puff sections are divided in identical intervals as in FIG. 3, the puff sections may include a first puff section including 1st to 10th puffs, a second puff section including 11th to 20th puffs, a third puff section including 21st to 30th puffs, a fourth puff section including 31st to 40th puffs, and a fifth puff section including 41st to 50th puffs. In this case, if the number of accumulated puffs is not included in the first to fifth puff sections, the controller may return to operation 301 or wait. Also, intervals for dividing the puff sections are not limited to 10 and may vary according to a design.

In operation 311, the controller may set the power supplied to a heater (e.g., the heater 230 of FIG. 2) to a first power value. For example, when the number of accumulated puffs counted during the first puff section is less than the threshold puff number, the controller may set the power to the first power value. As another example, even if the number of puffs counted during the first puff section is equal to or greater than the threshold puff number, when the current puff is detected after the threshold time has passed from the previous puff, the controller may set the power to the first power value.

In operation 309, the controller may set the power supplied to the heater to a second power value less than the first power value. For example, when the number of puffs counted during the first puff section is equal to or greater than the threshold puff number and the threshold time has not passed from the previous puff, the controller may set the power to the second power value less than the first power value.

In operation 315, the controller may set the power supplied to the heater to a third power value greater than the first power value. In this case, assuming that the second puff section includes a greater number of accumulated puffs than the first puff section, the controller may set the power to the third power value greater than the first power value. Accordingly, the aerosol-generating device (e.g., the aerosol-generating device 200 of FIG. 2) may prevent the transfer amount of nicotine from decreasing according to the accumulation of the user's puffs. That is, the aerosol-generating device 200 may provide the user with the uniform transfer amount of nicotine.

Figure 4:
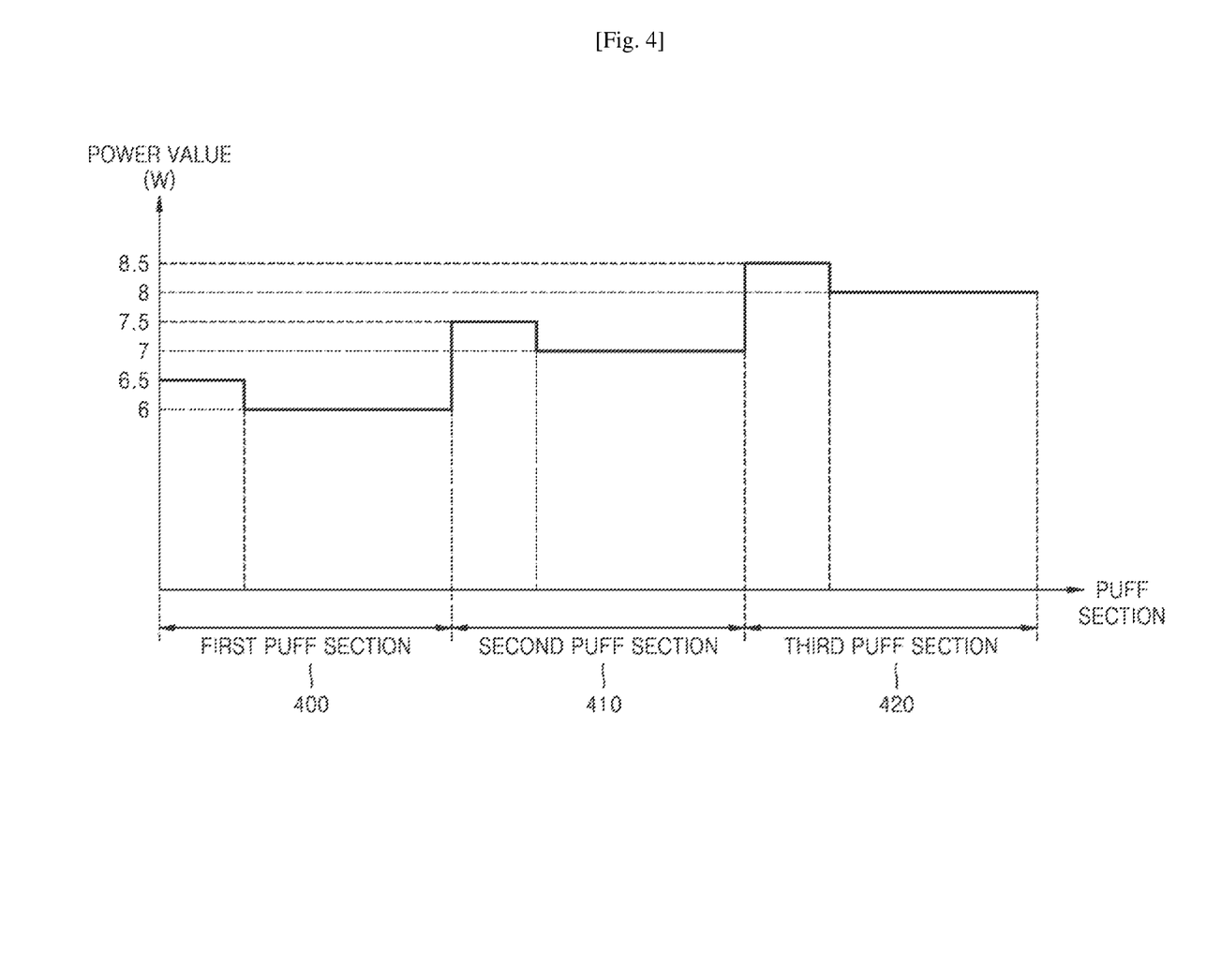
FIG. 4 is a graph showing power ranges in puff sections, according to an embodiment.

FIG. 4 is a graph showing power ranges in puff sections, according to an embodiment.

Referring to FIG. 4, the number of accumulated puffs including the current puff may be included in any one of the puff sections. For example, the puff sections may be divided into a first puff section 400, a second puff section 410, and a third puff section 420. However, the illustration of FIG. 4 is for the convenience of explanation, and the number of puff sections is not limited thereto.

The puff sections may have different power ranges. For example, the first puff section 400 including 1st to 10th puffs may correspond to a first power range (e.g., from about 6 W to about 6.5 W), the second puff section 410 including 11th to 20th puffs may correspond to a second power range (e.g., from about 7 W to about 7.5 W), and the third puff section 420 including 21th to 30th puffs may correspond to a third power range (e.g., from about 8 W to about 8.5 W). In an embodiment, a maximum value of the first power range corresponding to the first puff section 400 may be less than a minimum value of the second power range corresponding to the second puff section 410. A maximum value of the second power range corresponding to the second puff section 410 may be less than a minimum value of the third power range corresponding to the third puff section 420.

In an embodiment, a power value in one puff section may abruptly decrease within a power range corresponding to the puff section as the number of accumulated puffs increases. For example, a power value corresponding to a portion of the first puff section 400 may be about 6.5 W, and a power value corresponding to other portions of the first puff section 400 may be about 6 W. In another embodiment, the power value may gradually decrease in a power range corresponding to at least a portion of the puff section. For example, a power value corresponding to a portion of the first puff section 400 may gradually decrease from about 6.5 W to about 6 W, and a power value corresponding to other portions of the first puff section 400 may be about 6 W.

FIG. 4 illustrates that each of the first puff section 400, the second puff section 410, and the third puff section 420 has two power values for convenience of explanation, but one or more embodiments are not limited thereto. In another embodiment, the first puff section 400 may include at least three power values. The power value corresponding to a portion of the first puff section 400 may be about 6.5 W, a power value corresponding to another portion of the first puff section 400 may be about 6.2 W, and a power value corresponding to the other portions of the first puff section 400 may be about 6 W.

FIGS. 5 to 9 illustrate various examples in which an aerosol-generating device variably controls power.

Figure 5:
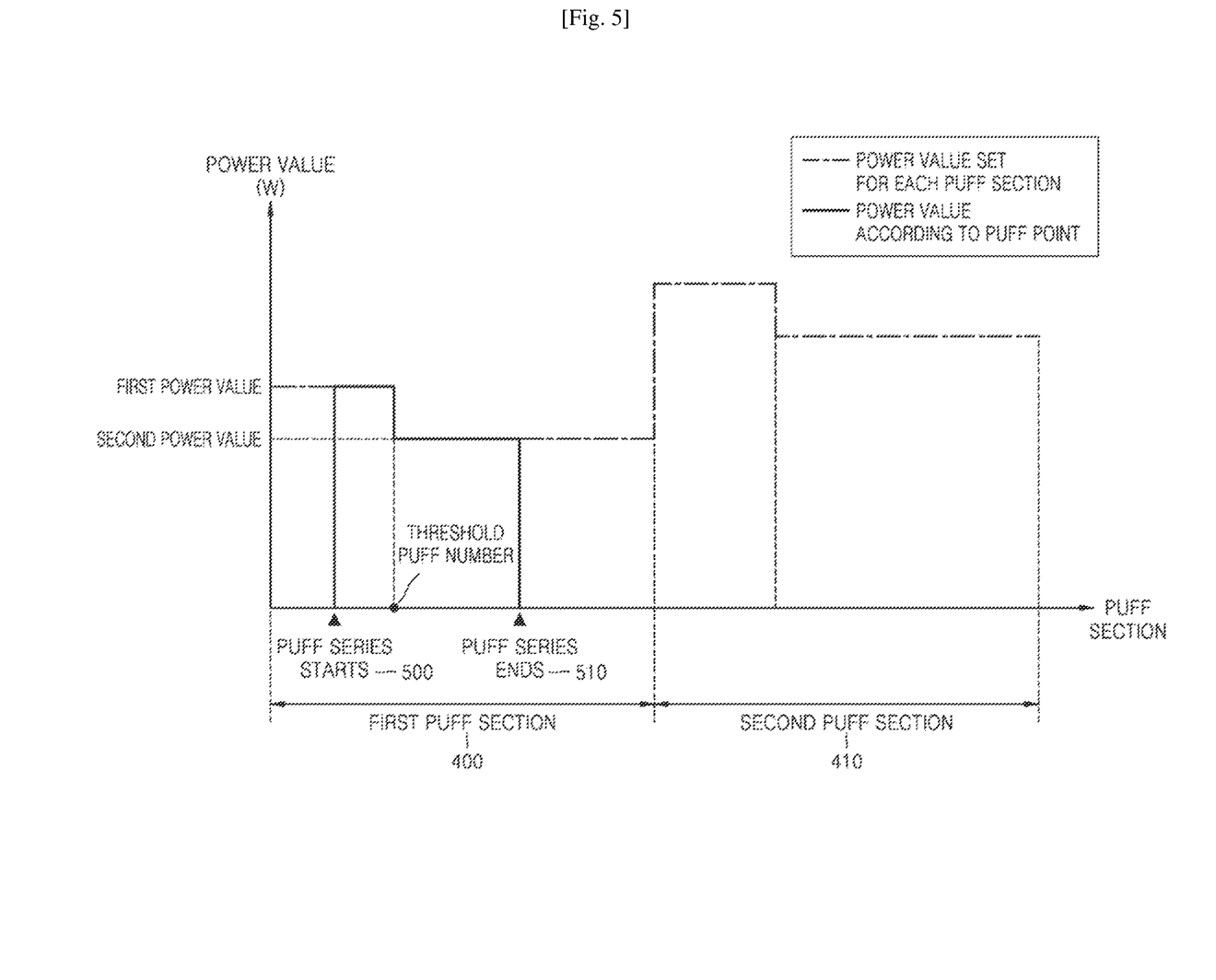
FIG. 5 illustrates a method of controlling power supplied to a heater in an example where the number of puffs counted during a current puff section is less than a threshold puff number.

Referring to FIG. 5, when a new puff series starts at time point 500 (i.e., the current puff is detected after a threshold time has passed from the previous puff), the number of accumulated puffs is included in the first puff section 400 and the number of puffs counted during the current puff section (i.e., first puff section 400) is less than a threshold puff number. In this case, a controller (e.g., the controller 210 of FIG. 2) may set power supplied to a heater (e.g., the heater 230 of FIG. 2) to a first power value. Then, when the number of puffs counted during the current puff section (i.e., the first puff section 400) is equal to or greater than the threshold puff number, the controller may decrease the power supplied to the heater from the first power value to the second power value. Also, if the puff series ends at time point 510, which still belongs to the first puff section 400, the controller may maintain the second power value until the puff series ends.

Figure 6:
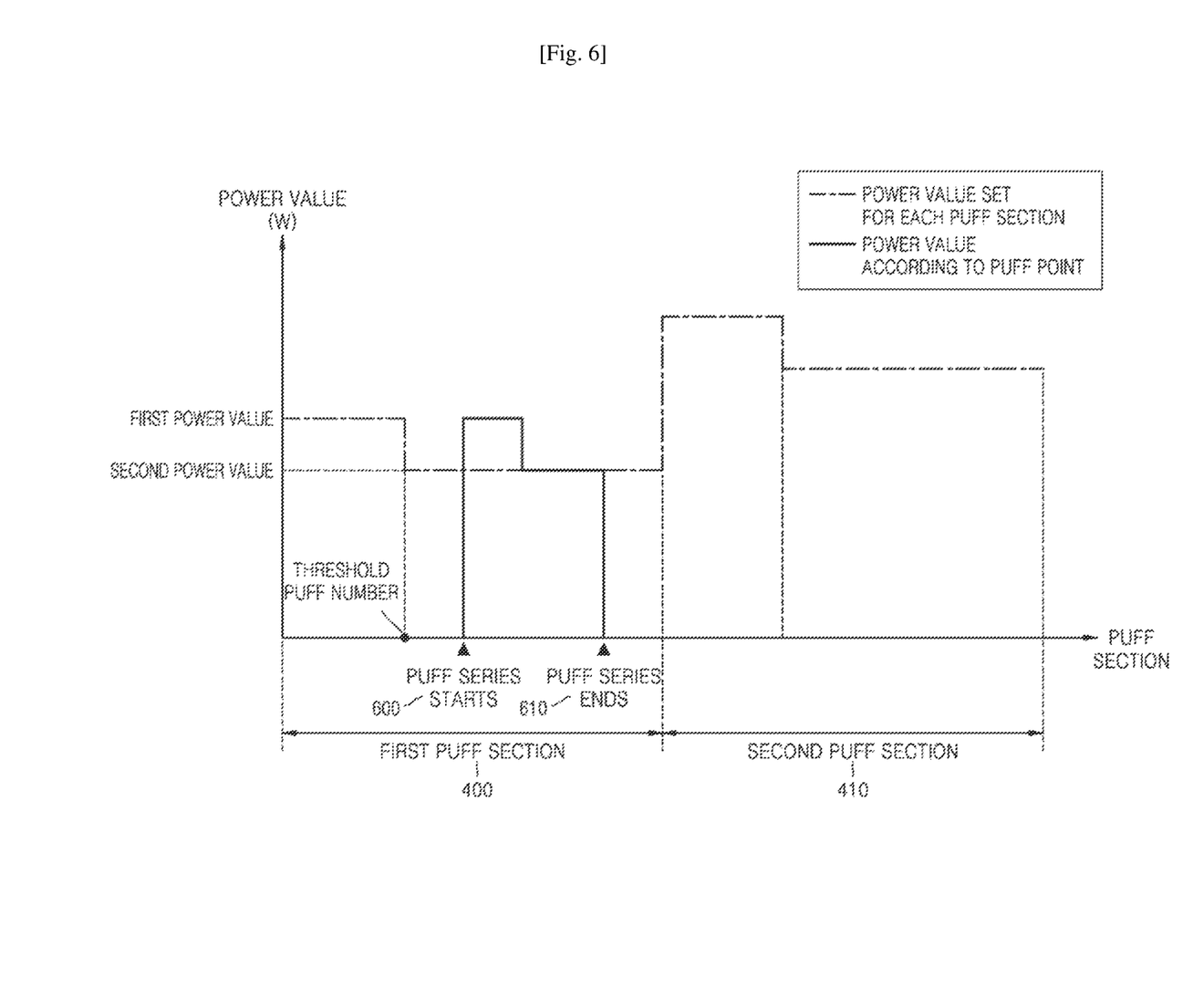
FIG. 6 illustrates a method of controlling power supplied to a heater in an example where the number of puffs counted during a current puff section is greater than a threshold puff number.

Referring to FIG. 6, when a new puff series starts at time point 600 in the first puff section 400, the number of puffs counted during the current puff section (i.e., the first puff section 400) is less than the threshold puff number. In this case, the controller (e.g., the controller 210 of FIG. 2) may control the power according to a "power value set for each puff section."

On the other hand, if the number of puffs counted during the first puff section 400 is equal to or greater than the threshold puff number, the controller may control the power according to a "power value according to a puff point." That is, as shown in FIG. 6, even if the number of puffs counted during the first puff section 400 is equal to or greater than the threshold puff number, the power may be set to the first power value, not to the second power value. This is because, if the heater is heated according to the second power value when the new puff series starts at time point 600, the heater may not be sufficiently heated, and the user may not have a satisfactory smoking sensation.

Then, when a certain period of time has passed, the controller may decrease the power supplied to the heater from the first power value to the second power value. The controller may maintain the second power value until the puff series ends at time point 610 in the first puff section 400.

Figure 7:
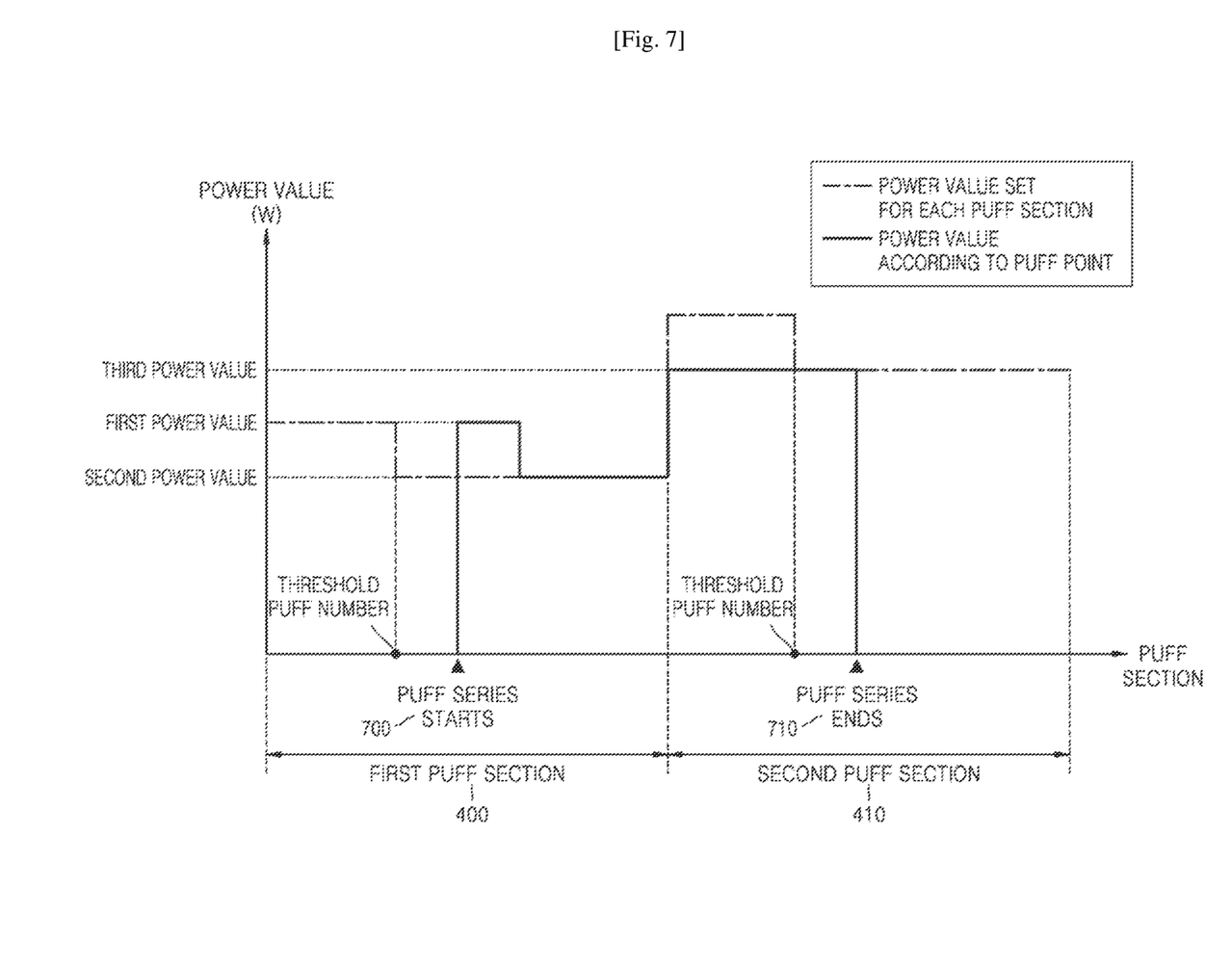
FIG. 7 illustrates a method of controlling power supplied to a heater in an example where a puff section is changed during consecutive puffs.

Referring to FIG. 7, when the new puff series starts at time point 700 in the first puff section 400 and the number of puffs counted during the current puff section (i.e., the first puff section 400) is equal to or greater than the threshold puff number, the controller may set the power supplied to the heater to the first power value. Then, after a certain period of time has passed, the controller may decrease the power supplied to the heater from the first power value to the second power value.

As shown in FIG. 7, the puff series that started at time point 700 in the first puff section 400 ends at time point 710 in the second puff section 410. In this case, according to the "power value set for each puff section," the power supplied to the heater may be set to a certain high value when the second puff section 410 started, and decrease the power to the third value when the number of puffs counted during the second puff section 410 reaches the threshold puff number. However, as shown in FIG. 7, the controller may set the power supplied to the heater to a third power value that is a minimum value of the power range corresponding to the second puff section 410, while the number of puffs counted during the second puff section 410 is less than the threshold puff number. That is, when a puff section is changed from the first puff section 400 to the second puff section 410 during continuous smoking, the controller may set the power to the third power value that is the minimum value of the power range corresponding to the second puff section 410.

Figure 8:
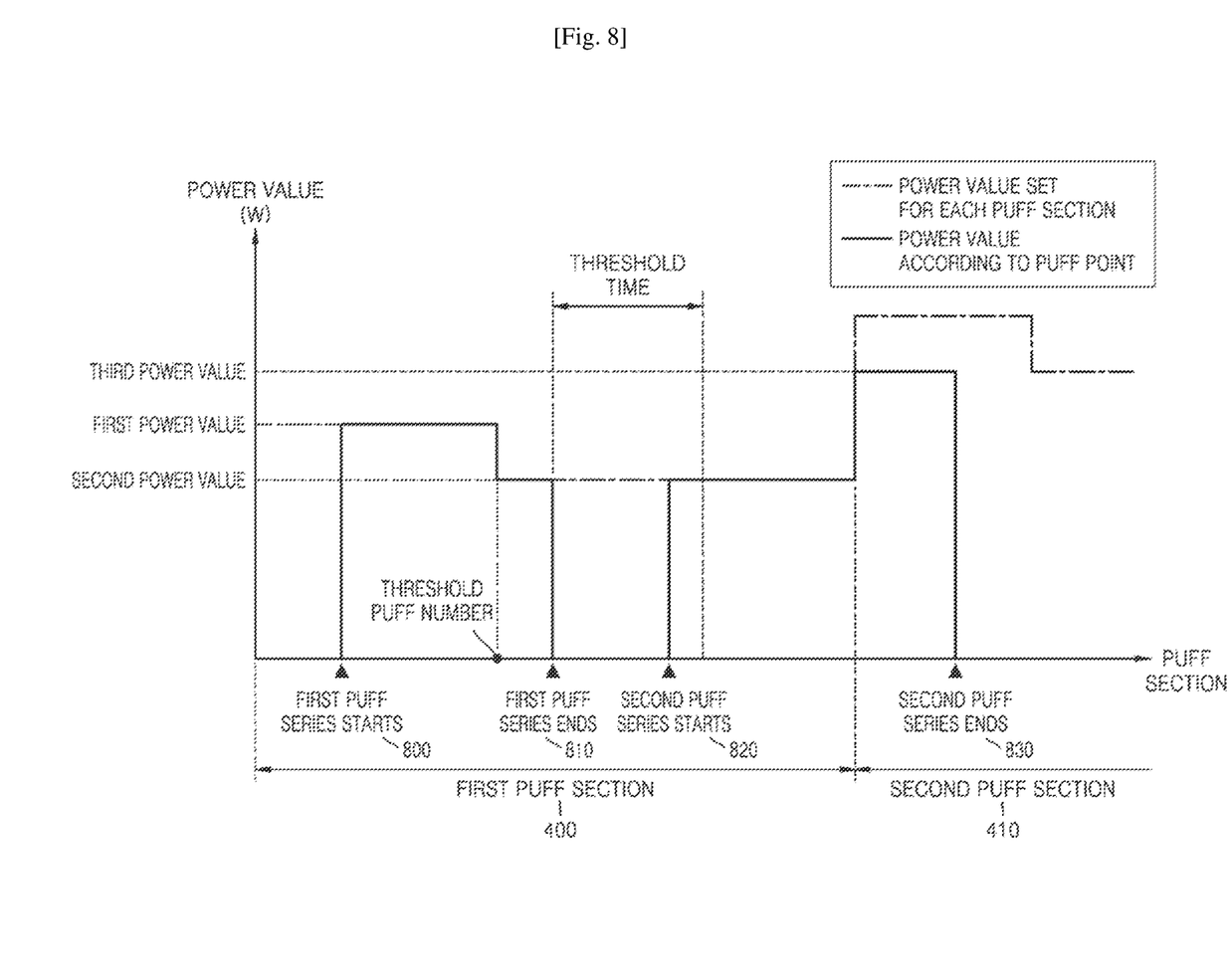
FIG. 8 illustrates a method of controlling power supplied to a heater in an example where an interval between puffs is less than a threshold time.

Referring to FIG. 8, when a first puff series starts at time point 800 in the first puff section 400, the number of puffs counted during the first puff section 400 is less than the threshold puff number. In this case, the controller may set the power supplied to the heater to the first power value. Then, when the number of puffs counted during the first puff section 400 is equal to or greater than the threshold puff number, the controller may decrease the power supplied to the heater from the first power value to the second power value. Also, the controller may maintain the second power value until the first puff series ends at time point 810 in the first puff section 400.

When the second puff series starts at time point 820 before a threshold time (e.g., 30 seconds) passes from the time point 810 (i.e., from when the first puff series ends), the controller may set the power supplied to the heater to the second power value. In this case, the controller may determine that the second puff series is continuous smoking and thus may set the power supplied to the heater to the second power value. In other words, although the terms "first puff series" and "second puff series" are used for convenience of description in FIG. 8, the first puff series and the second puff series belong to the same puff series.

In another embodiment, when a medium part (e.g., the medium part 140 of FIG. 1) is rotated according to the user action, the controller may reset the number of accumulated puffs. Accordingly, the controller may return to an initial point of the first puff section 400 and may set the power supplied to the heater to the first power value. However, when the medium part is rotated according to the user action within the threshold time after the time point 810 when the first puff series ends, the controller may set the power supplied to the heater to the second power value.

As shown in FIG. 8, when a puff section is changed from the first puff section 400 to the second puff section 410 during the second puff series starts, the controller may set the power to the third power value that is the minimum value of the power range corresponding to the second puff section 410.

Figure 9:
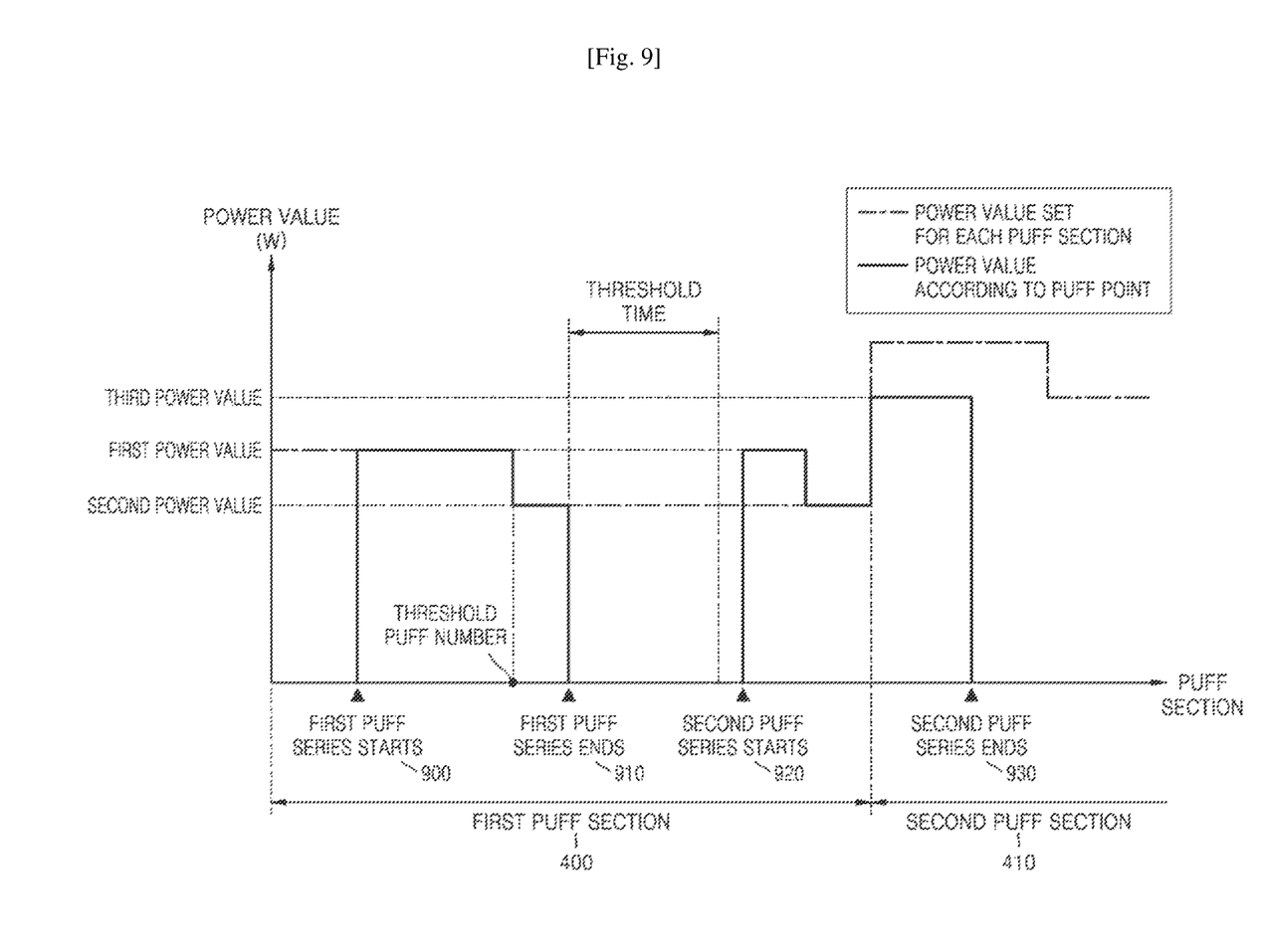
FIG. 9 illustrates a method of controlling power supplied to a heater in an example where a puff series starts after a threshold time has passed from a previous puff series.

Referring to FIG. 9, when a first puff series starts at time point 900 in the first puff section 400, the number of puffs counted during the first puff section 400 is less than the threshold puff number. In this case, the controller may set the power supplied to the heater to the first power value. Then, when the number of puffs counted during the first puff section 400 is equal to or greater than the threshold puff number, the controller may decrease the power supplied to the heater from the first power value to the second power value. Also, the controller may maintain the second power value until the first puff series ends at time point 910 in the first puff section 400.

Next, when the second puff series starts at time point 920 after the threshold time has passed from time point 910 (i.e., from when the first puff series ends), the controller may set the power supplied to the heater to the first power value. In this case, the controller may determine that the second puff series is a new smoking series and may set the power supplied to the heater to the first power value.

In another embodiment, when the medium part (e.g., the medium part 140 of FIG. 1) is rotated according to the user action, the controller may reset the number of accumulated puffs. Accordingly, the controller may return to the initial point of the first puff section 400 and may set the power supplied to the heater to the first power value. That is, when the medium part is rotated according to the user action after the threshold time has passed from time point 910 (i.e., from when the first puff series ends), the controller may set the power supplied to the heater to the first power value. Then, after a certain period of time has passed, the controller may decrease the power supplied to the heater from the first power value to the second power value.

As shown in FIG. 9, when a puff section is changed from the first puff section 400 to the second puff section 410 during the second puff series, the controller may set the power to the third power value that is the minimum value of the power range corresponding to the second puff section 410.

For the convenience of explanation, FIGS. 8 and 9 only illustrate that the power is set to the first power value or the second power value depending on whether the threshold time has passed from time points 810 and 910 when the first puff series ends. However, one or more embodiments are not limited thereto. In another embodiment, if the amount of time which has passed after the first puff series ended is greater than a first threshold time and smaller than a second threshold time, the controller may set the power supplied to the heater to a value between the first power value and the second power value.

For example, when the second puff series starts before a first threshold time (e.g., 20 seconds) has passed from when the first puff series ended, the controller may set the power supplied to the heater to a first power value (e.g., 6 W). In this case, when the second puff series starts after a second threshold time (e.g., 30 seconds) has passed from when the first puff series ended, the controller may set the power supplied to the heater to a second power value (e.g., 6.5 W). Also, if the second puff series starts after a first threshold time (e.g., 20 seconds) has passed but before the second threshold time (e.g., 30 seconds) has passed from when the first puff series ended, the controller may set the power supplied to the heater to a value (e.g., 6.2 W) between the first power value and the second power value.

Figure 10:
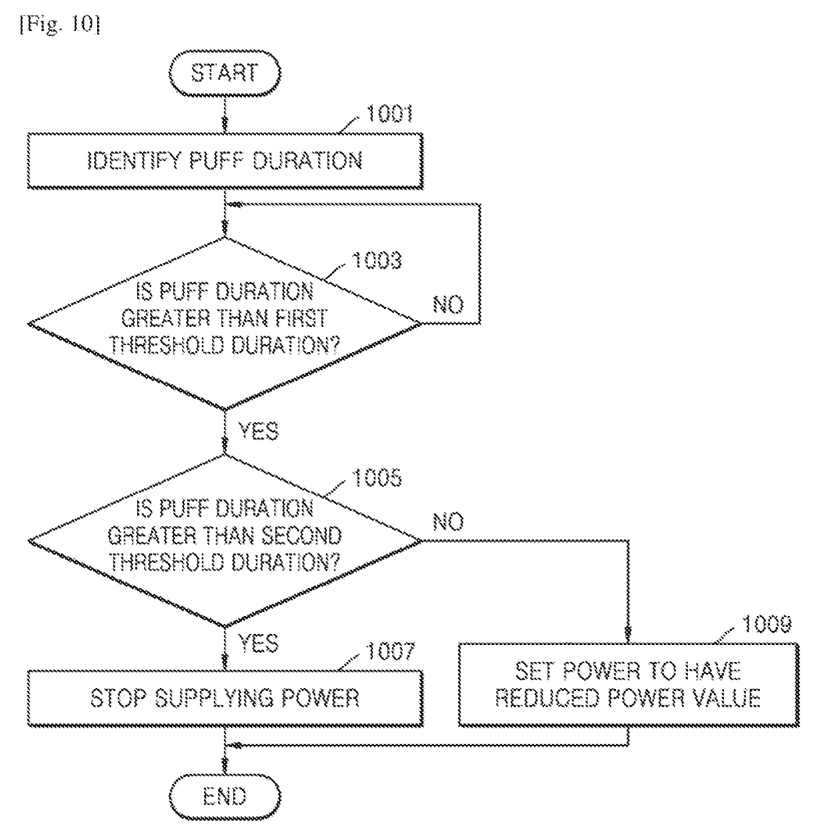
FIG. 10 is a flowchart of an operation of an aerosol-generating device according to an embodiment.

FIG. 10 is a flowchart of an operation of an aerosol-generating device according to an embodiment.

Referring to FIG. 10, in operation 1001, a controller (e.g., the controller 210 of FIG. 2) of an aerosol-generating device (e.g., the aerosol-generating device 200 of FIG. 2) may identify a puff duration detected by a puff detection sensor (e.g., the puff detection sensor 240 of FIG. 2).

In operation 1003, the controller may determine whether the detected puff duration is greater than a first threshold duration. For example, when the first puff duration is one second and the puff duration detected by the puff detection sensor is 1.5 seconds, the controller may determine that the puff duration is greater than the first threshold duration.

When the detected puff duration is greater than the first threshold duration, the controller may proceed to operation 1005, and when the detected puff duration is not greater than the first threshold duration, the controller may return to operation 1003 or wait.

In operation 1005, the controller may determine whether the detected puff duration is greater than a second threshold duration. For example, when the second threshold duration is 3 seconds and the puff duration detected by the puff detection sensor is 1.5 seconds, the controller may determine that the puff duration is not greater than the second threshold duration.

When the detected puff duration is greater than the second threshold duration, the controller may proceed to operation 1007, and when the detected puff duration is not greater than the second threshold duration, the controller may proceed to operation 1009. For example, when the first threshold duration is one second and the second threshold duration is 3 seconds, and when the puff duration detected by the puff detection sensor is 1.5 seconds, the controller may set power supplied to a heater (e.g., the heater 230 of FIG. 2) to a reduced power value. As another example, when the first threshold duration is one second and the second threshold duration is 3 seconds, and when the puff duration detected by the puff detection sensor is 3.5 seconds, the controller may stop the power supply to the heater.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol-generating device comprising:
a heater configured to heat an aerosol-generating material;
a puff detection sensor configured to detect puffs of a user;
a battery configured to supply power to the heater; and
a controller configured to:

based on a first puff being detected by the puff detection sensor, count a number of accumulated puffs including the first puff and determine a first time point of the first puff,
determine a smoking stage corresponding to the number of accumulated puffs, from among a plurality of smoking stages which are set according to a preset number of accumulated puffs, wherein the plurality of smoking stages correspond to a plurality of power ranges, respectively,
control the power supplied to the heater based on a power range corresponding to the determined smoking stage,
detect, using the puff detection sensor, a second puff within the determined smoking stage after the first puff is detected,
determine a second time point of the second puff,
based on the second time point of the second puff being after a threshold time has passed from the first time point of the first puff, control the power supplied to the heater based on a first power value of the power range corresponding to the determined smoking stage, and
based on the second time point of the second puff being before the threshold time has passed from the first time point of the first puff, control the power supplied to the heater based on a second power value of the power range corresponding to the determined smoking stage, wherein the second power value is different from the first power value.

2. The aerosol-generating device of claim 1, wherein a maximum value of a first power range corresponding to a first smoking stage is less than a minimum value of a second power range corresponding to a second smoking stage comprising a greater number of accumulated puffs than the first smoking stage.

3. The aerosol-generating device of claim 1, wherein the controller is configured to set the power supplied to the heater to the first power value when the number of accumulated puffs is less than a threshold puff number, and set the power supplied to the heater to the second power value less than the first power value when the number of accumulated puffs is equal to or greater than the threshold puff number.

4. The aerosol-generating device of claim 3, wherein the controller is configured to set the power supplied to the heater to the first power value based on the second puff being detected after the threshold time has passed from the first puff, even if the number of accumulated puffs is equal to or greater than the threshold puff number.

5. The aerosol-generating device of claim 1, wherein the controller is configured to start supplying the power to the heater when the second puff is detected, and decrease the power supplied to the heater as the second puff continues.

6. The aerosol-generating device of claim 5, wherein the controller is configured to stop supplying the power to the heater when a puff duration of the second puff reaches a threshold duration.

7. The aerosol-generating device of claim 1, wherein the controller is configured to decrease the power supplied to the heater by about 30% to about 70% based on a heating temperature of the heater exceeding a threshold temperature.

8. The aerosol-generating device of claim 1, further comprising:
a medium part comprising a plurality of chambers each accommodating a tobacco material; and
a vaporizer that is in fluid communication with a chamber selected by a user action from among the plurality of chambers such that an aerosol generated from the aerosol-generating material passes through a tobacco material included in the selected chamber.

9. The aerosol-generating device of claim 8, the controller is configured to reset the number of accumulated puffs when the medium part is rotated by the user action.

* * * * *